United States Patent
Ohara (10) Patent No.: US 8,295,482 B2
(45) Date of Patent: Oct. 23, 2012

(54) IMAGE SCANNING SYSTEM, AND IMAGE SCANNER AND COMPUTER READABLE MEDIUM THEREFOR

(75) Inventor: Kiyotaka Ohara, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 497 days.

(21) Appl. No.: 12/558,622

(22) Filed: Sep. 14, 2009

(65) Prior Publication Data

US 2010/0074442 A1    Mar. 25, 2010

(30) Foreign Application Priority Data

Sep. 25, 2008    (JP) ................................. 2008-245903

(51) Int. Cl.
*H04L 9/00* (2006.01)
*H04L 29/06* (2006.01)

(52) U.S. Cl. ........ 380/243; 380/244; 380/245; 380/146; 713/165

(58) Field of Classification Search .......... 380/243–246; 713/165

See application file for complete search history.

(56) References Cited

U.S. PATENT DOCUMENTS

| 5,642,199 | A | 6/1997 | Ukai et al. |
| 7,831,041 | B2 * | 11/2010 | Tanaka ............................. 380/44 |
| 8,068,607 | B2 * | 11/2011 | Oshima ........................... 380/33 |
| 2001/0056541 | A1 | 12/2001 | Matsuzaki et al. |
| 2003/0044012 | A1 * | 3/2003 | Eden ............................... 380/243 |
| 2005/0141010 | A1 * | 6/2005 | Kanai ............................ 358/1.14 |
| 2005/0154884 | A1 * | 7/2005 | Van Den Tillaart ........... 713/165 |
| 2005/0210259 | A1 * | 9/2005 | Richardson ..................... 713/179 |
| 2006/0050875 | A1 * | 3/2006 | Gammel et al. ................. 380/43 |
| 2006/0294391 | A1 * | 12/2006 | Wu ................................. 713/182 |
| 2007/0050628 | A1 * | 3/2007 | Ochi .............................. 713/176 |
| 2007/0143632 | A1 | 6/2007 | Matsuzaki et al. |
| 2007/0170250 | A1 * | 7/2007 | Bystrom et al. .............. 235/382 |
| 2007/0269042 | A1 * | 11/2007 | Tanaka ........................... 380/44 |
| 2007/0283446 | A1 * | 12/2007 | Yami et al. ...................... 726/27 |
| 2008/0065894 | A1 * | 3/2008 | Wang et al. ................... 713/176 |

(Continued)

FOREIGN PATENT DOCUMENTS

EP    0950941 A2    10/1999

(Continued)

OTHER PUBLICATIONS

Decision of Rejection dispatched Nov. 9, 2010 in Japanese Application No. 2008-245903 and English translation thereof.

(Continued)

*Primary Examiner* — Catherine Thiaw
(74) *Attorney, Agent, or Firm* — Banner & Witcoff, Ltd.

(57) ABSTRACT

An image scanning system includes an image scanner and a terminal device connected with the image scanner. The terminal device accepts a password, stores an image encryption key, encrypts the image encryption key with the password, sends the encrypted image encryption key to the image scanner, receives image data encrypted from the image scanner, and decrypts the image data encrypted using one of the image encryption key and an image decryption key corresponding to the image encryption key. The image scanner receives the encrypted image encryption key from the terminal device, accepts a password, decrypts the encrypted image encryption key with the password, performs document scanning to create image data, encrypts the image data using the image encryption key decrypted, and sends the image data encrypted to the terminal device.

14 Claims, 6 Drawing Sheets

U.S. PATENT DOCUMENTS

| | | |
|---|---|---|
| 2008/0130884 A1 | 6/2008 | Matsumoto et al. |
| 2008/0199008 A1* | 8/2008 | Hattori .......................... 380/243 |
| 2009/0034723 A1* | 2/2009 | Yanazume ....................... 380/54 |
| 2009/0235163 A1* | 9/2009 | Moriwaki ....................... 715/256 |
| 2009/0287953 A1* | 11/2009 | Mizuno et al. ................... 714/3 |
| 2010/0031034 A1* | 2/2010 | Kim ............................... 713/165 |

FOREIGN PATENT DOCUMENTS

| | | |
|---|---|---|
| EP | 1154348 A2 | 11/2001 |
| JP | 60-208137 A | 10/1985 |
| JP | 2-130045 A | 5/1990 |
| JP | 5-219049 A | 8/1993 |
| JP | 06-037749 A | 2/1994 |
| JP | 2001-352452 | 12/2001 |
| JP | 2002-033727 A | 1/2002 |
| JP | 2002-099514 A | 4/2002 |
| JP | 2004-266559 A | 9/2004 |
| JP | 2005-236809 A | 9/2005 |
| JP | 2006-050535 | 2/2006 |
| JP | 2008-003883 A | 1/2008 |
| JP | 2008-147717 A | 6/2008 |
| JP | 2008-166861 A | 7/2008 |
| WO | 2004/040410 A2 | 5/2004 |

OTHER PUBLICATIONS

JP Questioning in Appeal Case 2011-2735, JP Appln. 2008-245903, mailed Jul. 12, 2011, English translation.

EP Search Report dtd Dec. 30, 2009, EP Appln. 09252174.9.

JP Office Action dtd Aug. 17, 2010, JP Appln. 2008-245903, English translation.

* cited by examiner

LADDER CHART WHEN ENCRYPTION KEY IS SET
AND SCANNER UNIT IS IN STANDBY STATE

FIG. 7

LADDER CHART WHEN SCANNER UNIT
IS PERFORMING DOCUMENT SCANNING

IMAGE SCANNING SYSTEM, AND IMAGE SCANNER AND COMPUTER READABLE MEDIUM THEREFOR

CROSS-REFERENCE TO RELATED APPLICATION

This application claims priority under 35 U.S.C. §119 from Japanese Patent Application No. 2008-245903 filed on Sep. 25, 2008. The entire subject matter of the application is incorporated herein by reference.

BACKGROUND

1. Technical Field

The following description relates to one or more image scanning techniques to achieve data communication for exchanging encrypted data between devices.

2. Related Art

So far an image scanning system has been known, in which data is transmitted and received in an encrypted manner between an image scanner and a terminal device connected communicably with the image scanner.

SUMMARY

In general, it is required for encrypting data to register an encryption key in each of devices between which encrypted data communication is performed. In general, two methods are applicable to encrypt data with a common key. One is a method in which a code as an encryption key is input into each of the devices (a first method). The other is a method in which the code is input into one of the devices and then sent by the device to the other device via a communication line (a second method).

However, the first method has a problem that it requires a user effort to input the code into each device. In addition, the second method has a problem that the encryption key might be stolen when the key is transmitted to the other device.

Aspects of the present invention are advantageous to provide one or more improved image scanning techniques that make it possible to register an encryption key for encrypting image data in both of an image scanner and a terminal device in an easy and secure manner.

According to aspects of the present invention, an image scanning system is provided, which includes an image scanner and a terminal device connected communicably with the image scanner. The terminal device includes a terminal-side password accepting unit configured to accept a password, a key storage unit configured to store an image encryption key for encrypting image data, a key encrypting unit configured to encrypt the image encryption key stored in the key storage unit, with the password accepted through the terminal-side password accepting unit, a key sending unit configured to send the image encryption key encrypted by the key encrypting unit to the image scanner, an image receiving unit configured to receive image data encrypted from the image scanner, and an image decrypting unit configured to decrypt the image data encrypted received from the image scanner, using one of the image encryption key stored in the key storage unit and an image decryption key corresponding to the image encryption key. The image scanner includes a key receiving unit configured to receive the encrypted image encryption key from the terminal device, a scanner-side password accepting unit configured to accept a password, a key decrypting unit configured to decrypt the encrypted image encryption key with the password accepted through the scanner-side password accepting unit, a scanner unit configured to perform document scanning to create image data, an image encrypting unit configured to encrypt the image data created by the scanner unit, using the image encryption key decrypted by the key decrypting unit, and an image sending unit configured to send the image data encrypted by the image encrypting unit to the terminal device.

According to aspects of the present invention, further provided is an image scanner configured to be connected communicably with a terminal device. The image scanner includes a key receiving unit configured to receive an image encryption key encrypted, from the terminal device, a password accepting unit configured to accept a password, a key decrypting unit configured to decrypt the encrypted image encryption key with the password accepted through the password accepting unit, a scanner unit configured to perform document scanning to create image data, an image encrypting unit configured to encrypt the image data created by the scanner unit, using the image encryption key decrypted by the key decrypting unit, and an image sending unit configured to send the image data encrypted by the image encrypting unit to the terminal device.

According to aspects of the present invention, further provided is a computer readable medium having computer readable instructions stored thereon. The instructions cause a computer connectable with an image scanner to perform a password accepting step of accepting a password, a key storing step of storing an image encryption key for encrypting image data, a key encrypting step of encrypting the image encryption key created in the key creating step, with the password accepted in the password accepting step, a key sending step of sending the image encryption key encrypted in the key encrypting step to the image scanner, an image receiving step of receiving image data encrypted from the image scanner, and an image decrypting step of decrypting the image data encrypted received from the image scanner, using one of the image encryption key stored in the key storing step and an image decryption key corresponding to the image encryption key.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

Figure 1:
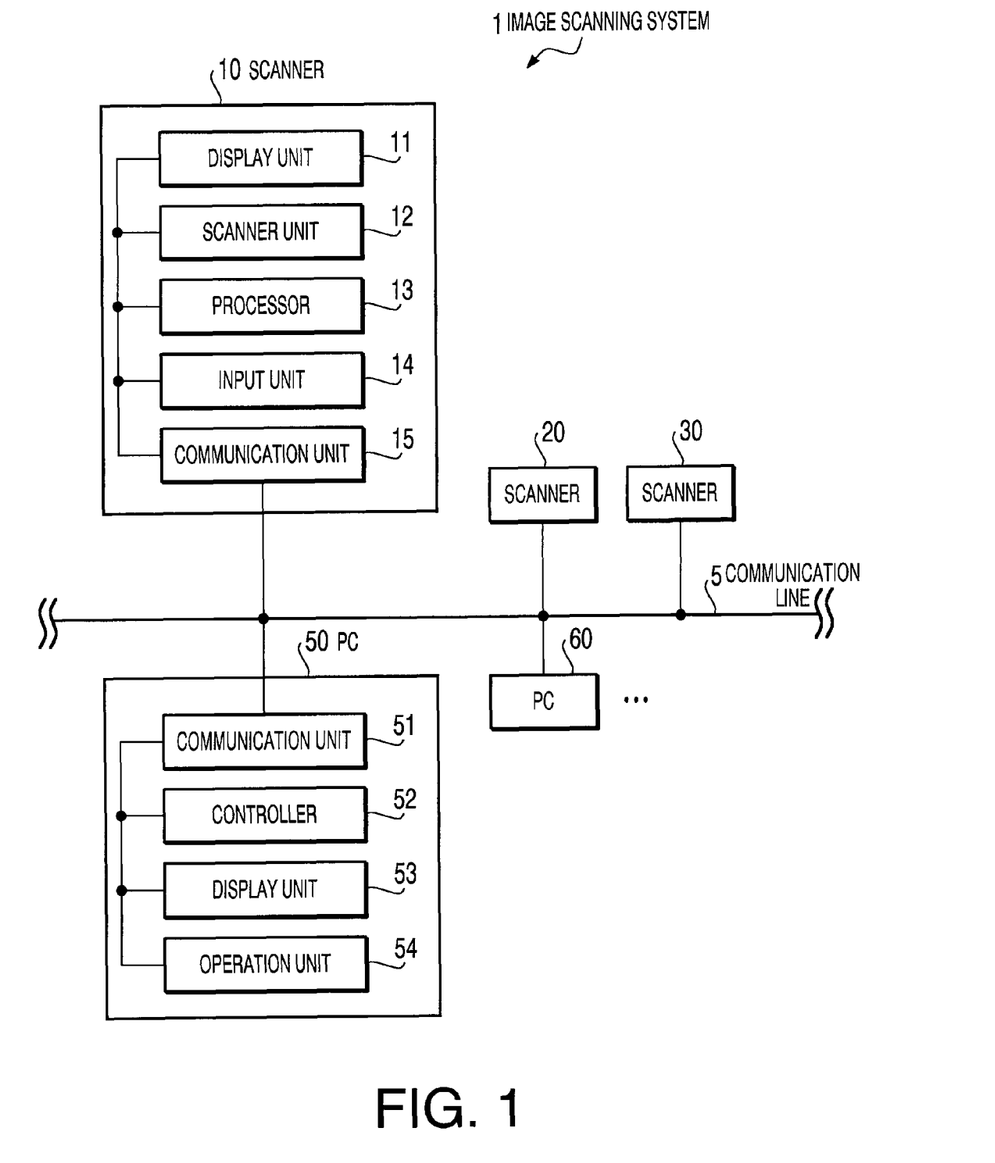
FIG. 1 is a block diagram schematically showing a configuration of an image scanning system in an embodiment according to one or more aspects of the present invention.

As illustrated in FIG. 1, an image scanning system 1 is configured with a plurality of scanners 10, 20, and 30, and a plurality of personal computers 50 and 60 (hereinafter, simply referred to as PCs 50 and 60) being interconnected via a communication line 5.

Each of the scanners 10, 20, and 30 includes a display unit 11, a scanner unit 12, a processor 13, an input unit 14, and a communication unit 15. In FIG. 1, a detailed configuration is illustrated only for the scanner 10 but not for each of the scanners 20 and 30. However, it is noted that the same configuration as shown for the scanner 10 applies to the scanners 20 and 30.

The display unit 11 is configured, as a known display device such as a liquid crystal display device, to display an image based on an image signal transmitted by the processor 13. The scanner unit 12 is configured, as a known scanning mechanism for scanning an image on a document, to be operated by a command issued by the processor 13 when a scanning instruction is input by a user through the input unit. Further, the input unit is configured with a plurality of buttons or a touch panel.

The communication unit 15 is configured as a known communication interface for communicating with other devices (in the embodiment, especially, the PCs 50 and 60) connected with the communication line 5. The processor 13 is configured as a known microcomputer that has a CPU, a ROM, and a RAM. The processor 13 performs a predetermined operation based on a program stored on the ROM thereof when an instruction is input via the input unit 14 or the communication unit 15. Additionally, the processor 13 includes a non-volatile memory such as a flash memory.

Each of the PCs 50 and 60 includes a communication unit 51, a controller 52, a display unit 53, and an operation unit 54. FIG. 1 gives a detailed illustration for the PC 50 but not for the PC 60. However, it is noted that the same as shown for the PC 50 applies to the PC 60.

The communication unit 51 is configured as a known communication interface for communicating with other devices (in the embodiment, especially, the scanners 10, 20, and 30) connected with the communication line 5, in the same manner as the communication unit 15 of each scanner 10, 20, or 30.

The display unit 53 is configured, as a known display device such as a liquid crystal display device, to display an image based on an image signal transmitted by the controller 52. The operation unit 54 is configured as a user interface such as a keyboard and a mouse.

The controller 52 is configured as a known microcomputer that includes a CPU, a ROM, and a RAM. The controller 52 performs a predetermined operation based on a program stored on the ROM thereof when an instruction is input through the communication unit 51 or the operation unit 54. Additionally, the controller 52 includes a non-volatile memory such as a hard disk drive (HDD).

[Operations in Embodiment]

The image scanning system 1 configured as above has a push-scan function to send, to the PCs 50 and 60 connected with the communication line 5, image data created by scanning a document with the scanner unit 12 of one of the scanners 10, 20, and 30 that the user directly instructs to perform image scanning. Further, in the image scanning system 1 of the embodiment, encrypted data created by encrypting the image data in the scanner 10, 20, or 30 is transmitted to the PC 50 or 60. The PCs 50 or 60 creates the image data before being encrypted, by decrypting the encrypted data.

In the image scanning system 1, a process is performed to set a common key at the sides of the scanners 10, 20, and 30 and the PCs 50 and 60 prior to data communication with respect to the image data. The process will be set forth with reference to FIG. 2.

Figure 2:
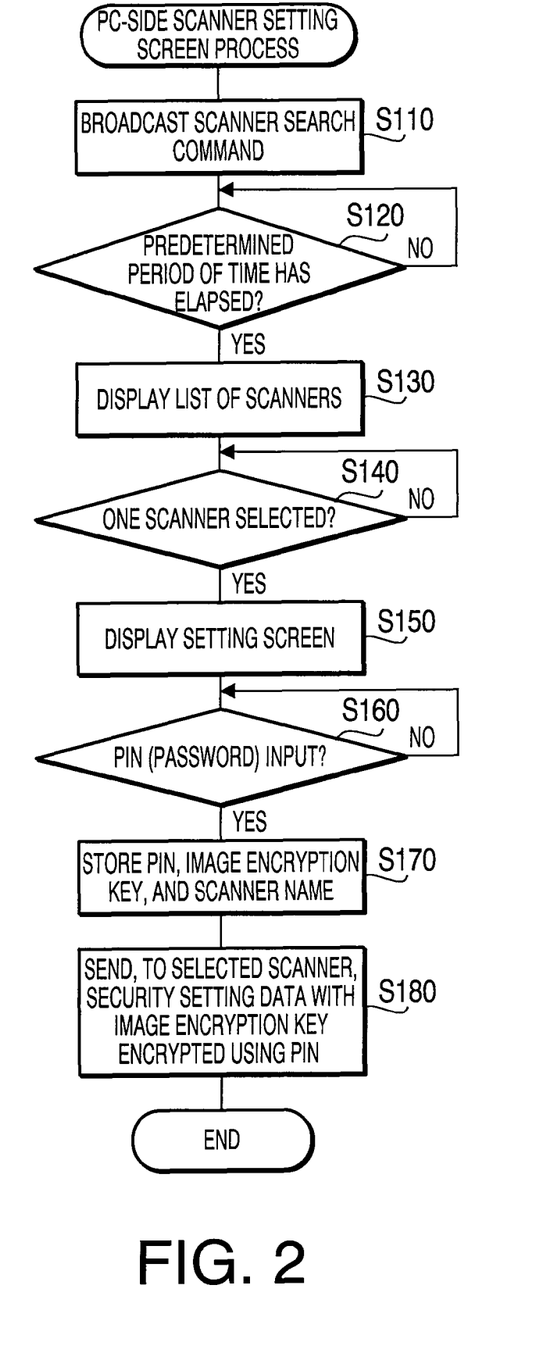
FIG. 2 is a flowchart showing a PC-side scanner setting screen process in the embodiment according to one or more aspects of the present invention.

A PC-side scanner setting screen process is launched, for instance, when an instruction is input to associate the PC 50 or 60 with the scanner 10, 20, or 30, such as, e.g., when software such as a scanner driver is installed into the PC 50 or 60. As illustrated in FIG. 2, the controller 52 broadcasts a scanner search command onto the communication line 5 (S110). In response to the scanner search command, each of the scanners 10, 20, and 30 returns a scanner name thereof to the PC 50 or 60 as a sending source of the command (S660 and S670 in a below-mentioned scanner main process).

Then, the controller 52 waits for a predetermined period of time until the controller 52 receives responses to the command (S120: No). After a lapse of the predetermined period of time (S120: Yes), the controller 52 creates a list of the scanners 10, 20, and 30 that have transmitted responses to the scanner search command, and displays the list on the display unit 53 (S130).

Subsequently, the controller 52 determines whether the user selects one of the scanners 10, 20, and 30 shown on the list through the operation unit 54 (S140). When any of the scanners 10, 20, and 30 is not selected (S140: No), the controller 52 repeats S140 until the selection is made.

When one of the scanners 10, 20, and 30 is selected (S140: Yes), a password setting screen is displayed on the display unit 53 (S150). The controller 52 accepts a password (in this case, a Personal Identification Number PIN) which the user inputs through the operation unit 54, and determines whether a password is input (S160). When a password is not input (S160: No), the controller 52 repeats S160 until a password is input.

Meanwhile, when a password is input (S160: Yes), the controller 52 creates an image encryption key using a random number that is determined at the moment when the password is input, and stores on the non-volatile memory the password (PIN), the image encryption key, and the name of the scanner in association with each other (S170). Then, the controller 52 encrypts the image encryption key with the password input in S160 to create an encrypted encryption key, and sends data that contains the encrypted encryption key as security setting data to the scanner 10, 20, or 30 selected in S140 (S180). It is noted that the image encryption key is used as a common key for encrypting and decrypting the image data.

Thereafter, the PC-side scanner setting screen process is terminated. In the scanner 10, 20, or 30 that has received the security setting data, a process to register the security setting data (S560 and S570 in the below-mentioned scanner main process) is executed.

Subsequently, a description will be given to set forth a process in which the scanner 10, 20, or 30 specifies a working one of the PCs 50 and 60 with reference to FIGS. 3A and 3B.

Figure 3A:
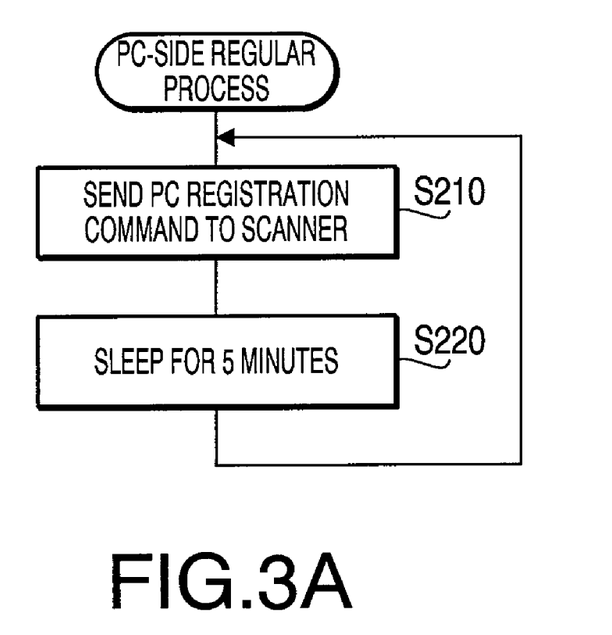
FIG. 3A is a flowchart showing a PC-side regular process in the embodiment according to one or more aspects of the present invention.

As shown in FIG. 3A, in a PC-side regular process, e.g., which is launched when the PC 50 or 60 is powered on, the controller 52 of the PC first sends a PC registration command that contains the name of the PC, to the scanner 10, 20, or 30 of which the scanner name is registered in the PC (S210). After that, the controller 52 sleeps for a predetermined period of time (e.g., five minutes) (S220). After a lapse of the predetermined period of time, the controller 52 again executes S210 and the following step.

The scanner 10, 20, or 30, which has received the PC registration command in the aforementioned PC-side regular process, performs a process (S610 and S620 in the below-mentioned scanner main process) for writing data into a PC list (e.g., stored on the RAM) on which PC names are registered in association with respective registration times, in response to the PC registration command.

Figure 3B:
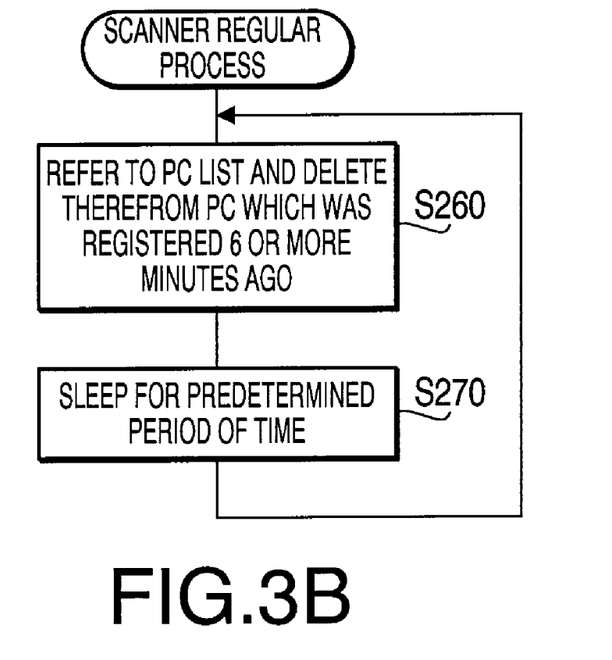
FIG. 3B is a flowchart showing a scanner regular process in the embodiment according to one or more aspects of the present invention.

Further, as illustrated in FIG. 3B, in a scanner regular process, e.g., which is launched when the scanner 10, 20, or 30 is powered on, the processor 13 of the scanner first refers to the PC list, and then selects and deletes a PC of which the registration time is six or more minutes ago (S260).

After that, the processor 13 sleeps for a predetermined period of time (e.g., five minutes) (S270). After a lapse of the predetermined period of time, the processor 13 again executes S260 and the following step. Thus, through the PC-side regular process and the scanner regular process, the scanner 10, 20, or 30 can specify a working PC among the PCs 50 and 60.

Next, a description will be given to set forth a process to be executed when the scanner 10, 20, or 30 receives various commands with reference to FIG. 4.

Figure 4:
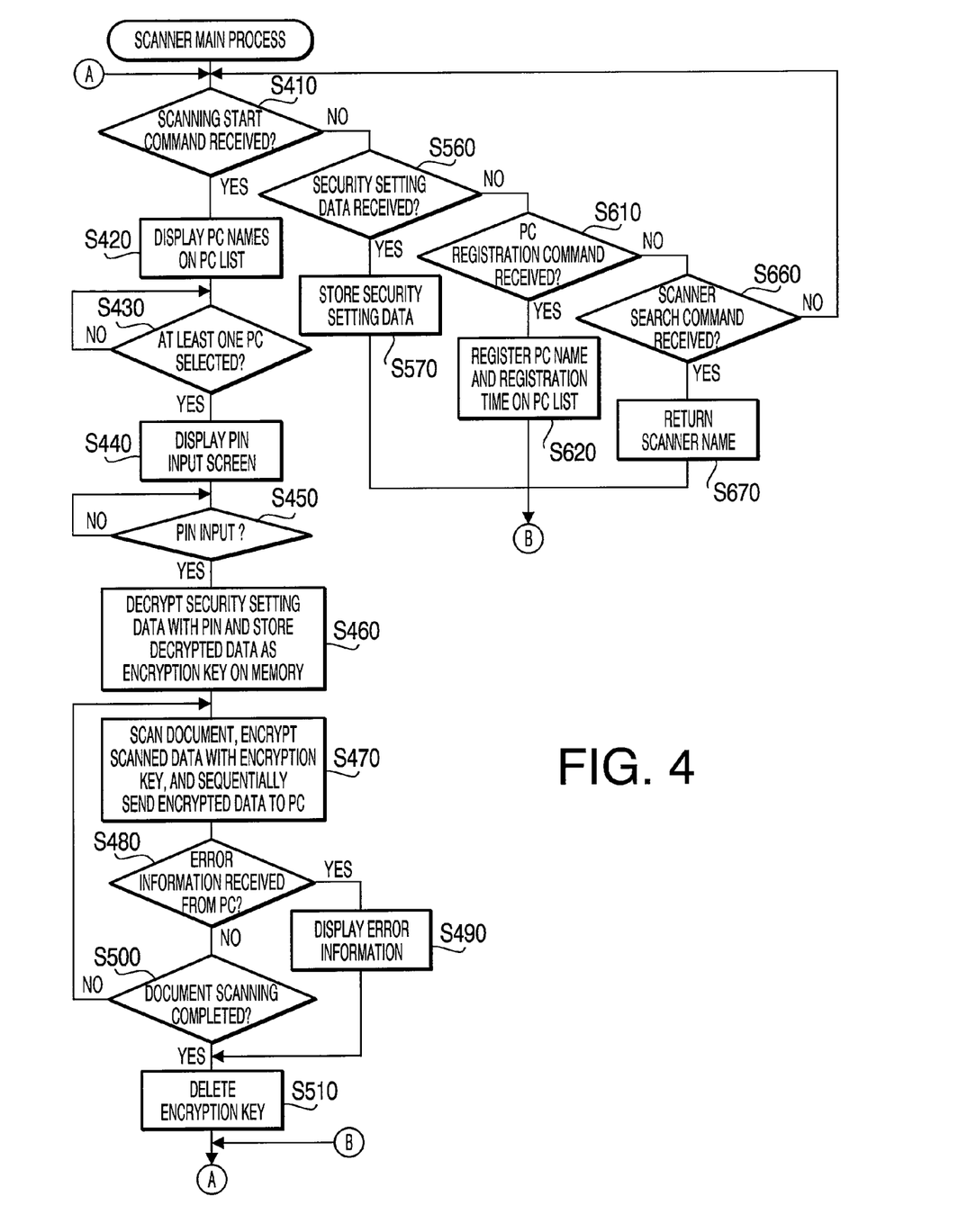
FIG. 4 is a flowchart showing a scanner main process in the embodiment according to one or more aspects of the present invention.

As illustrated in FIG. 4, in a scanner main process, e.g., which is launched when the scanner 10, 20, or 30 is powered on, the processor 13 of the scanner first determines whether any command or data is input via the input unit 14 or the communication unit 15 (S410, 5560, S610, and S660). When any command or data is not received (S410, S560, S610, and S660: No), the processor 13 repeats the steps S410, S560, 5610, and S660 until any command or data is received.

When the security setting data is received (S410: No, and 5560: Yes), the processor 13 stores, on the non-volatile memory incorporated therein, the received security setting data (containing the encrypted encryption key) and identification data (e.g., an IP address) of the PC as the sending source of the security setting data in association with each other (S570), and then repeats the scanner main process from the beginning.

When the PC registration command is received (S410 and S560: No, and S610: Yes), the processor 13 registers, on the PC list, the PC name included in the PC registration command and the registration time (S620), and thereafter repeats the scanner main process from the beginning.

When the scanner search command is received (S410, S560, and S610: No, and S660: Yes), the processor 13 returns the name of the scanner to the PC 50 or 60 as the sending source of the scanner search command (S670), and then repeats the scanner main process from the beginning.

Subsequently, when the processor 13 detects a scanning start command via the input unit 14 (S410: Yes), the steps of 5420 to S510 are performed. Specifically, the processor 13 first displays, in a list format, the PC names registered on the PC list at the present time (S420), and then induces a user to select a PC name which represents a destination PC for the image data.

Next, the processor 13 determines whether at least one PC name is selected (S430). When any PC name is not selected (S430: No), the processor 13 repeats the step S430 until at least one PC name is selected.

Meanwhile, when at least one PC name is selected (S430: Yes), the processor 13 displays on the display unit 11 a screen for setting a password (in this case, a PIN) (S440), and induces the user to input a password. Then, the processor 13 determines whether a password is input via the input unit 14 (S450). When a password is not input (S450: No), the processor 13 repeats S450 until a password is input.

Meanwhile, when a password is input (S450: Yes), the processor 13 decrypts, with the input password, the security setting data (the encrypted encryption key) stored in association with the identification data of the PC selected in S430, and stores the decrypted encryption key on a memory such as the RAM (S460). Then, the processor 13 scans the document with the scanner unit 12 being moved, and encrypts the image data created by the document scanning with the decrypted encryption key, and sends the encrypted image data to the PC 50 or 60 selected in S430 (S470).

Subsequently, the processor 13 determines whether error information is received from the PC 50 or 60 to which the encrypted image data is being sent (S480). When error information is received (S480: Yes), the processor 13 displays on the display unit 11 information that an error occurs (S490), and deletes the decrypted encryption key stored on the memory (S510). In this case, the processor 13 stops the operation of the scanner unit 12 at the moment when receiving the error information.

Meanwhile, when error information is not received (S480: No), the processor 13 determines whether the document is completely scanned (and the data encryption is completed) (S500). When the document is not completely scanned (S500: No), the processor 13 repeats S470 and the following steps.

Meanwhile, when the document is completely scanned (S500: Yes), the processor 13 stops the operation of the scanner unit 12, and deletes the decrypted encryption key stored on the memory (S510). Thereafter, the processor 13 repeats the scanner main process from the beginning.

Next, explanation will be given about a process to be executed by the PC 50 or 60 that receives the encrypted data with reference to FIG. 5.

Figure 5:
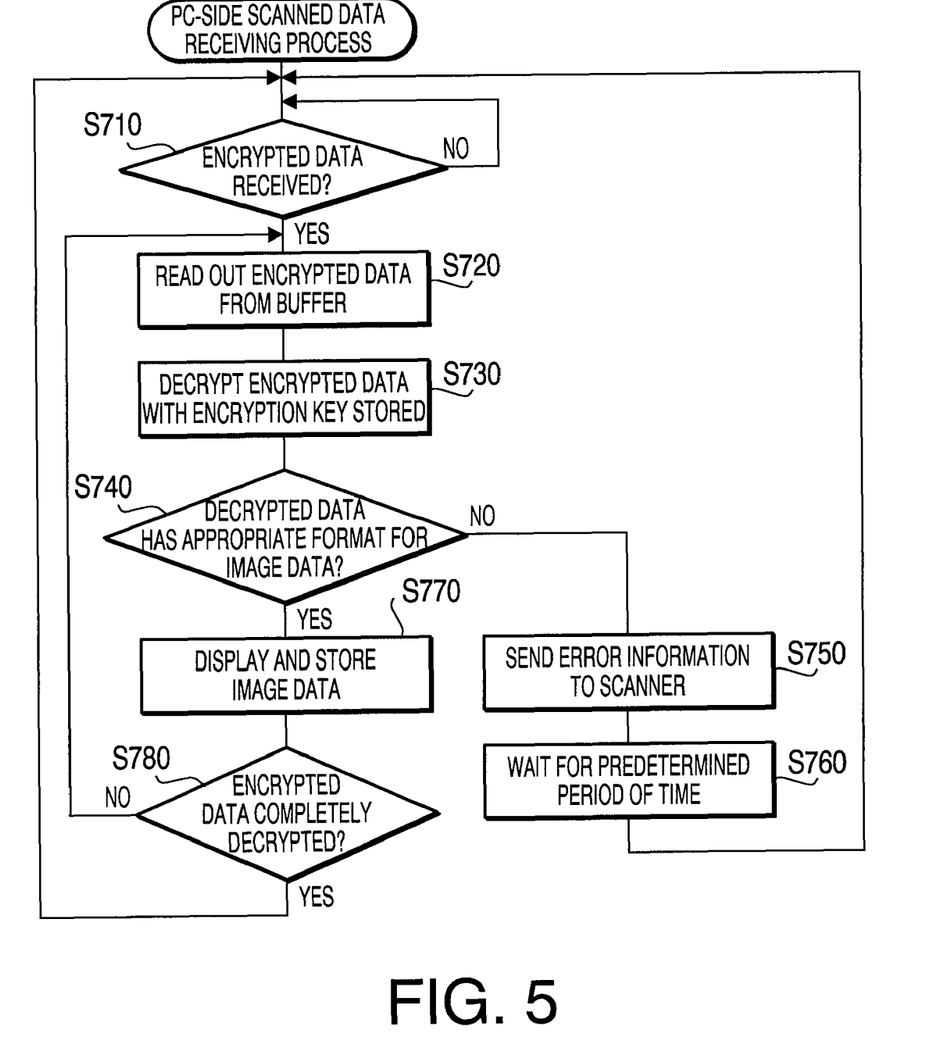
FIG. 5 is a flowchart showing a PC-side scanned data receiving process in the embodiment according to one or more aspects of the present invention.

As illustrated in FIG. 5, in a PC-side scanned data receiving process, e.g., which is launched when the PC 50 or 60 is powered on, the controller 52 of the PC first determines whether the encrypted data is received from any scanner on the network (S710). When the encrypted data is not received (S710: No), the controller 52 repeats S710 until the encrypted data is received. Meanwhile, when the encrypted data is received (S710: Yes), the controller 52 reads out the encrypted data from a buffer (which is provided in the communication unit 51) on which the encrypted data is temporarily stored (S720), and then decrypts the encrypted data with the image encryption key that corresponds to the name of the scanner as the sending source of the encrypted data (S730).

Then, the controller 52 determines whether the image data decrypted has an appropriate format (S740). In this step, the determination is made based on whether a header of the image data decrypted corresponds to a header that should be provided to image data.

When the image data decrypted does not have an appropriate format (S740: No), the controller 52 sends error information to the scanner 10, 20, or 30 that is transmitting the encrypted data (S750), and waits for a predetermined period of time (S760). The reason why the controller 52 waits for the predetermined period of time in this manner is to prevent an improper operation from being repeated for a short while when such an improper operation is intentionally performed for the scanner 10, 20, or 30. After waiting for the predetermined period of time, the controller 52 repeats the PC-side scanned data receiving process from the beginning.

Meanwhile, when the image data decrypted has an appropriate format (S740: Yes), the controller 52 outputs the image data (S770). Specifically, the controller 52 displays the image data on the display unit 53 and stores the image data on the non-volatile memory.

Then, the controller 52 determines whether the encrypted data is completely decrypted (S780). When the encrypted data is not completely decrypted (S780: No), the controller 52 repeats S720 and the following steps. Meanwhile, when the encrypted data is completely decrypted (S780: Yes), the controller 52 repeats the PC-side scanned data receiving process from the beginning.

Here, referring to FIGS. 6 and 7, explanation will be given about data exchanged between the scanner 10, 20, or 30 and the PC 50 or 60 in the aforementioned various processes.

Figure 6:
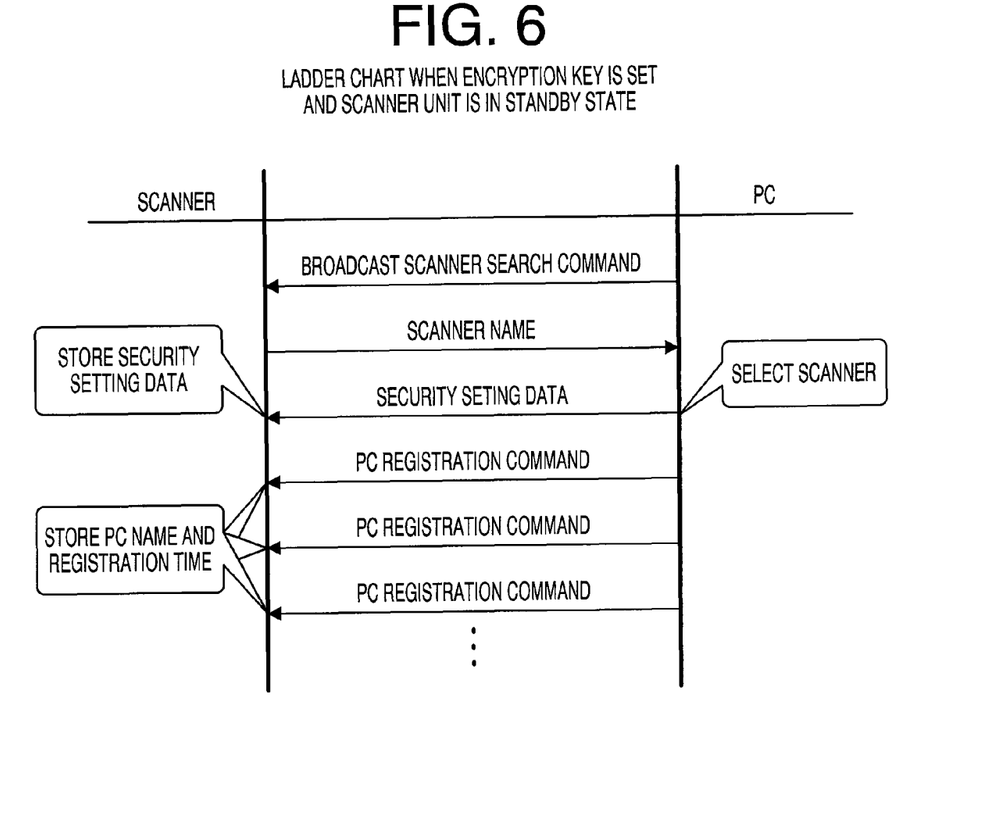
FIG. 6 is a ladder chart illustrating data communication performed between a scanner and a PC when an encryption key is set and a scanner unit of the scanner is in a standby state in the embodiment according to one or more aspects of the present invention.

When the encryption key is set, first, the PC 50 or 60 performs the PC-side scanner setting screen process, in which the controller 52 broadcasts the scanner search command to the scanners 10, 20, and 30 (S110) as shown in FIG. 6. Then, the scanners 10, 20, and 30 return the respective scanner names thereof to the PC 50 or 60 (S670).

Subsequently, the PC 50 or 60 transmits the security setting data to a scanner selected from the scanners 10, 20, and 30 (S180). When the scanner 10, 20, or 30 receives and stores therein the security setting data (S570), the encryption key is completely set.

After that, as illustrated in FIG. 6, the PC 50 or 60 regularly sends the PC registration command to the scanner 10, 20, or 30 to inform the scanner 10, 20, or 30 that the scanner is working (S220). Every time the scanner 10, 20, or 30 receives the PC registration command, the scanner 10, 20, or 30 registers, on the PC list, the name of the PC that has sent the PC registration command and the registration time (S270).

Figure 7:
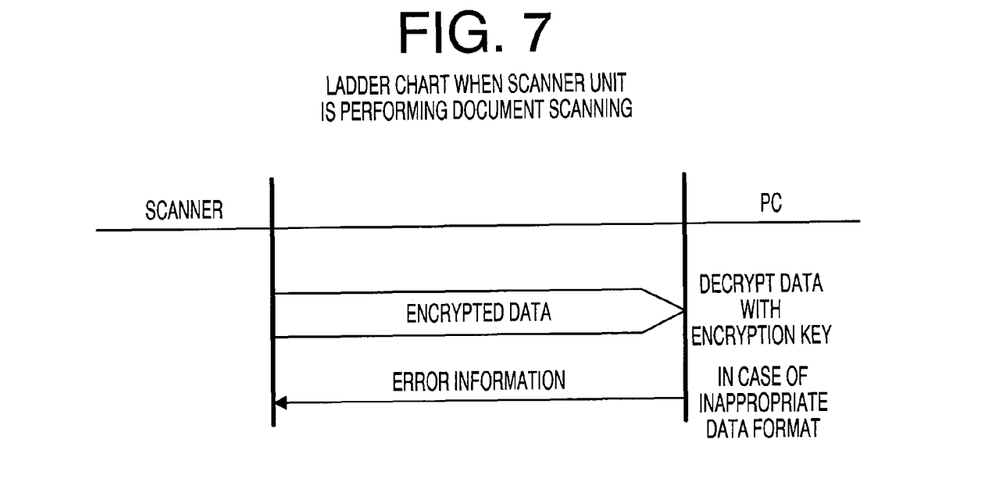
FIG. 7 is a ladder chart illustrating data communication performed between the scanner and the PC when the scanner unit is performing document scanning in the embodiment according to one or more aspects of the present invention.

At the time of document scanning, as shown in FIG. 7, the encrypted data is transmitted by the scanner 10, 20, or 30 to the PC 50 or 60 (S470). The PC 50 or 60 decrypts the encrypted data (S730). When the image data decrypted has an inappropriate format (S740: No), the PC 50 or 60 sends error information to the scanner 10, 20, or 30 (S750).

[Effects of Embodiment]

In the aforementioned image scanning system 1, the controller 52 of the PC 50 or 60 accepts a password input by the user. Then, the controller 52 sends, to a selected one of the scanners 10, 20, and 30, the encrypted encryption key that is created by encrypting, with the input password, the image encryption key for encrypting the image data generated by the scanner 10, 20, or 30.

On the other hand, the processor 13 of the scanner 10, 20, or 30 stores on the non-volatile memory incorporated therein the encrypted encryption key transmitted by the PC 50 or 60. Then, the processor 13 accepts a password input by the user, and creates image data based on an image scanned from a document in response to the user command. Further, when sending the created image data, the processor 13 decrypts the encrypted encryption key stored on the non-volatile memory thereof with the password accepted by the scanner 10, 20, or 30. Additionally, the processor 13 creates the encrypted data with the encryption key decrypted. Then, the processor 13 transmits the encrypted data to the PC 50 or 60.

Moreover, the controller 52 of the PC 50 or 60 decrypts the encrypted data transmitted by the scanner 10, 20, or 30 with the image encryption key. According to the image scanning system 1, by inputting a password at the PC 50 or 60, the user can register the encryption key (common key) for encrypting image data in the scanner 10, 20, or 30. Further, in the embodiment, the encryption key that is transmitted by the PC 50 or 60 and stored in the scanner 10, 20, or 30 is an encrypted encryption key that is created by encrypting the image encryption key for encrypting image data with the password. Therefore, even though the encrypted encryption key is stolen, the image encryption key is not soon available. Thus, the encryption key for encrypting image data can be registered in both of the scanner 10, 20, or 30 and the PC 50 or 60 in an easy and secure manner.

Further, in the image scanning system 1, the PC 50 or 60 determines whether the decrypted data created by decrypting the encrypted data is normal data. When determining that the decrypted data is normal data, the PC 50 or 60 outputs the decrypted data.

According to the image scanning system 1, the PC 50 or 60 can determine whether the encrypted data received is normally decrypted (i.e., whether the password for creating the image encryption key utilized for encrypting the image data is appropriate). Further, when the encrypted data is normally decrypted, the PC 50 or 60 can output the decrypted data. Thereby, it is possible to prevent abnormal data from being output.

Further, in the image scanning system 1, when the decrypted data is not normal, the controller 52 of the PC 50 or 60 informs the scanner 10, 20, or 30 which has sent the encrypted data before being decrypted about the abnormally decrypted data.

According to the image scanning system 1, the PC 50 or 60 can inform the scanner 10, 20, or 30 about whether the received encrypted data is normally decrypted. Therefore, the user can confirm with the scanner 10, 20, or 30 whether the PC 50 or 60 normally decrypts the encrypted data, without having to move to the PC 50 or 60.

Further, in the image scanning system 1, the scanner 10, 20, or 30 deletes the encryption key utilized for encrypting the image data, provided that the scanner has sent the encrypted data. According to the image scanning system 1, it is possible to prevent an encryption key that may be the same as the image encryption key utilized for decrypting the encrypted data from continuing to be stored in an unencrypted manner in the scanner 10, 20, or 30.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, in order to determine whether the decrypted data is normal, the PC 50 or 60 checks whether the header of the decrypted data has an appropriate format. However, any method may be applied, such as a method for determining whether the decrypted data has a normal data array.

In the aforementioned embodiment, the PC-side scanned data receiving process, shown in FIG. 5, is launched when the PC is powered on. However, for instance, the PC-side scanned data receiving process may be launched, provided that the PC-side scanner setting screen process, shown in FIG. 2, has been performed.

Further, in S170 of the PC-side scanner setting screen process, the PC may store the encryption key and the scanner name, but not store the password. When the password is not stored, it is possible to prevent the password from being stolen from the non-volatile memory of the PC.

Furthermore, the scanners 10, 20, and 30 in the aforementioned embodiment may be configured as multi-function peripherals that have various functions such as a printer function and a facsimile function.

Additionally, in the aforementioned embodiment, the image data encrypted at the scanner side using an image encryption key as a common key is decrypted at the PC side using the image encryption key. However, the image scanning system 1 may be configured such that the image data encrypted at the scanner side using an image encryption key as a public key is decrypted at the PC side using an image decryption key as a private key corresponding to the image encryption key.

What is claimed is:

1. An image scanning system comprising:
    an image scanner: and
    a terminal device connected communicably with the image scanner, wherein the terminal device comprises:
        a storage unit configured to store an image encryption key for encrypting image data;
        a first communication unit configured to receive encrypted image data from the image scanner; and
        a controller configured to:
            accept a password;
            encrypt the image encryption key, stored in the storage unit, with the password;
            send the encrypted image encryption key to the image scanner; and
            decrypt the encrypted image data, received from the image scanner, using one of the image encryption key stored in the storage unit and an image decryption key corresponding to the image encryption key, and
    wherein the image scanner comprises:
        a second communication unit configured to receive the encrypted image encryption key from the terminal device;
        a storage unit configured to store the encrypted image encryption key, received from the terminal device, in association with identification data for identifying the terminal device;
        an input unit configured to receive a password;
        a scanner unit configured to perform document scanning to create image data; and
        a processor configured to:
            decrypt the encrypted image encryption key with the password inputted through the input unit of the image scanner;
            encrypt the image data created by the scanner unit, using the decrypted image encryption key; and
            send the encrypted image data to the terminal device;
        wherein the processor of the image scanner is further configured to decrypt the encrypted image encryption key stored in the storage unit in association with the identification data before sending the encrypted image data to the terminal device.

2. The image scanning system according to claim 1, wherein the controller of the terminal device is further configured to:
    determine whether the decrypted image data has an appropriate format; and
    output the decrypted image data, when determining that the decrypted image data has an appropriate format.

3. The image scanning system according to claim 2, wherein the controller of the terminal device is further configured to inform the image scanner of an error when determining that the decrypted image data does not have an appropriate format.

4. The image scanning system according to claim 1, wherein the processor of the image scanner is further configured to, provided that the encrypted image data has been sent to the terminal device, delete the decrypted image encryption key used by the processor to create the encrypted image data.

5. The image scanning system according to claim 4,
    wherein the image scanner further comprises a storage unit configured to store the decrypted image encryption key,
    wherein the processor is configured to encrypt the image data using the decrypted image encryption key stored on the storage unit, and
    wherein the processor is configured to, provided that the encrypted image data has been sent to the terminal device, delete the decrypted image encryption key from the storage unit.

6. The image scanning system according to claim 1, further comprising a second terminal device connected communicably with the image scanner, wherein the second terminal device comprises:
    a storage unit configured to store a second image encryption key for encrypting image data;
    a first communication unit configured to receive encrypted image data from the image scanner; and
    a controller configured to:
        accept a second password;
        encrypt the second image encryption key, stored in the storage unit, with the second password;
        send the second encrypted image encryption key to the image scanner; and
        decrypt the encrypted image data, received from the image scanner, using one of the second image encryption key stored in the storage unit and an image decryption key corresponding to the image encryption key.

7. The image scanning system according to claim 1, wherein the storage unit of the terminal device is configured to store the image encryption key, the password accepted by the controller, and a name of the image scanner in association with each other.

8. An image scanner configured to be connected communicably with a terminal device, comprising:
    a communication unit configured to receive an encrypted image encryption key from the terminal device;
    a storage unit configured to store the encrypted image encryption key, received from the terminal device, in association with identification data for identifying the terminal device;

an input unit configured to receive a password;

a scanner unit configured to perform document scanning to create image data; and a processor configured to:
- decrypt the encrypted image encryption key with the password inputted through the input unit;
- encrypt the image data created by the scanner unit, using the decrypted image encryption key; and
- send the encrypted image data to the terminal device;

wherein the processor of the image scanner is further configured to decrypt the encrypted image encryption key stored in the storage unit in association with the identification data before sending the encrypted image data to the terminal device.

9. The image scanner according to claim 8, wherein the processor is further configured to, provided that the encrypted image data has been sent to the terminal device, delete the decrypted image encryption key used by the processor to create the encrypted image data.

10. The image scanner according to claim 9, further comprising a storage unit configured to store the decrypted image encryption key, wherein the processor is configured to encrypt the image data using the decrypted image encryption key stored on the storage unit, and wherein the processor is configured to, provided that the encrypted image data has been sent to the terminal device, delete the decrypted image encryption key from the storage unit.

11. A non-transitory computer readable medium having computer readable instructions stored thereon, the instructions causing a computer connectable with an image scanner to perform:
- a password accepting step of accepting a password;
- a key storing step of storing an image encryption key for encrypting image data, wherein the key storing step further comprises storing the image encryption key, the password, and a name of the image scanner in association with each other;
- a key encrypting step of encrypting the image encryption key stored in the key storing step, with the password accepted in the password accepting step;
- a key sending step of sending the encrypted image encryption key encrypted to the image scanner;
- an image receiving step of receiving encrypted image data from the image scanner; and
- an image decrypting step of decrypting the encrypted image data received from the image scanner, using one of the image encryption key stored in the key storing step and an image decryption key corresponding to the image encryption key.

12. The non-transitory computer readable medium according to claim 11, wherein the instructions further causes the computer to perform:
- a determining step of determining whether the decrypted image data has an appropriate format; and
- an output step of, when it is determined in the determining step that the decrypted image data has an appropriate format, outputting the decrypted image data.

13. The non-transitory computer readable medium according to claim 12, wherein the instructions further causes the computer to perform:
- an informing step of, when it is determined in the determining step that the decrypted image data does not have an appropriate format, informing the image scanner of an error.

14. The non-transitory computer readable medium according to claim 11, wherein the instructions further cause the computer to perform a scanner selecting step of selecting the image scanner from among a displayed list of scanners before inputting the password.

* * * * *